Patented July 11, 1933

1,917,248

UNITED STATES PATENT OFFICE

NORMAN D. HANSON, OF BLOOMFIELD, NEW JERSEY, ASSIGNOR TO BAKELITE CORPORATION, OF NEW YORK, N. Y., A CORPORATION OF DELAWARE

PHENOL-FURFURAL RESIN AND METHOD OF MAKING THE SAME

No Drawing. Application filed December 22, 1927. Serial No. 242,018.

This invention relates to resins of the known type prepared by reaction between phenol or cresol and furfural, in presence of a catalyst. Such resins as heretofore prepared (compare article on "The Action of Furfural on Phenols" by Beckman and Dehn, Sitzungsberichte der Physikalish-mathematischen Klasse der Preissichen Akadennie der Wissenschaften, Berlin, 1918, pages 1201–1221), are reactive in the sense that they may be rendered infusible, and insoluble in ordinary resin solvents, by a sufficient application of heat; but they react so slowly as to be of little value in commercial molding operations, a molding piece ¼″ thick requiring 10–30 minutes treatment in the heated mold to effect a sufficient hardening. Quicker reacting resins are obtainable by a two-stage process, of the kind disclosed in U. S. patents 1,038,475 to Baekeland and 1,020,593 to Aylsworth, a permanently fusible (non-reactive) phenol-furfural resin being first formed, and admixed with sufficient hexamethylenetetramine to impart a reactive character; but this method has the disadvantage of replacing a considerable proportion of the furfural by the more expensive hexamethylenetetramine.

I have discovered that it is possible so to accelerate the hardening of the phenol-furfural resins of the reactive type first above mentioned that the cure in the mold and under molding conditions will be completed in a small fraction of the time mentioned above. I accomplish this by the addition of accelerators which in the preferred embodiment of my invention comprise lime and hexamethylenetetramine, conjointly used.

Following is the preferred method of carrying my invention into effect, it being understood however that the invention is not restricted to the particular proportions and conditions therein given by way of example:

100 parts by weight of furfural are nixed with 100 parts of cresol or phenol, and 2 parts of sodium carbonate ($Na_2CO_3$). The mixture is heated under a reflux for two hours, and thereafter in the open or in vacuo to eliminate water. The resulting dehydrated resin is reactive, but hardens slowly under standard molding conditions. It is now thoroughly mixed with about 8 parts by weight of lime, together with a small proportion say 1–4 parts, of hexamethylenetetramine, and heating is continued at 100°–140° C. until a thick fusible resin results, a sample of which is brittle when cold. The resin is then incorporated with fibrous or other fillers to form a molding mixture. This molding mixture hardens rapidly under standard molding conditions (1½ to 3 minutes for a ¼″ disc) and gives molded products having excellent mechanical and electrical properties.

The present invention is to be clearly distinguished from prior processes, above referred to, in which a non-reactive resin is first formed, and rendered reactive by suitable additions of hexamethylenetetramine, functioning as a methylene-containing hardening agent. In the present case, the initial resin is reactive, but slow-curing; and the function of the additions typified by lime and hexamethylenetetramine is to shorten the time required for curing.

The present invention is also to be distinguished from that disclosed in a co-pending application of G. W. Miller, Serial No. 171,910, according to which in one modification, a reactive cresol-furfural resin is admixed with lime, with a non-active phenol-methylene resin, and with sufficient hexamethylenetetramine to impart to this latter resin a reactive characted. In such case, the hexamethylenetetramine functions as a hardening agent for the non-reactive phenol-methylene resin, and not, as in the present invention, as an accelerator for the reactive cresol-furfural resin.

While I prefer to use lime and hexamethylenetetramine as accelerating additions to the reactive furfural resin, it is within the scope of my invention to replace the lime wholly or in part by other basic materials such as magnesia; and to substitute the hexamethylenetetramine wholly or in part by paraformaldehyde. Cresol may be replaced by phenol but the latter is less desirable as tending to produce rubbery and imperfectly fusible resins at an early stage of the condensation.

I claim:

1. The hereindescribed resinous condensation product, comprising a reactive phenol-furfural resin having incorporated therewith an accelerator including a basic substance which will neither combine with nor yield aldehydic groups and a methylene-yielding body.

2. The hereindescribed resinous condensation product, comprising a reactive phenol-furfural resin having incorporated therewith an accelerator including lime and hexamethylenetetramine.

3. Method of making a resinous condensation product, comprising reacting upon a phenolic body with furfural in proportion to yield a reactive resin; and incorpating therewith an accelerator including a basic substance which will neither combine with nor yield aldehydic groups and a methylene-yielding body.

4. Method of making a resinous condensation product, comprising reacting upon a phenolic body with furfural in proportion to yield a reactive resin; and incorporating therewith an accelerator including lime and hexamethylenetetramine.

5. The hereindescribed resinous condensation product comprising a reactive phenol-furfural resin having incorporated therewith lime and a methylene-yielding body.

6. The hereindescribed resinous condensation product comprising a reactive cresol-furfural resin having incorporated therewith a basic substance which will neither combine with nor yield aldehydic groups and a methylene-yielding body.

7. Method of making a resinous condensation product comprising reacting upon a phenolic body with furfural in proportion to yield a reactive resin; and incorporating therewith lime and a methylene-yielding body.

8. Method of making a resinous condensation product comprising reacting cresol with furfural in proportion to yield a reactive resin; and incorporating therewith a basic substance which will neither combine with nor yield aldehydic groups and a methylene-yielding body.

9. Method of making a resinous condensation product comprising reacting about 100 parts of a phenol with about 100 parts of furfural; and incorporating with the resulting resin about 8 parts of lime and about 1 to 4 parts of hexamethylenetetramine.

10. Resinous condensation product as defined in claim 1 in which the basic substance is a compound of a metal.

11. Resinous condensation product as defined in claim 1 in which the basic substance is a compound of an alkali forming metal.

12. Resinous condensation product as defined in claim 1 in which the basic substance is a compound of an alkaline earth metal.

13. Resinous condensation product as defined in claim 1 in which the basic substance is an alkaline earth metal oxid.

14. Resinous condensation product as defined in claim 6 in which the basic substance is lime.

15. The herein described resinous condensation product comprising a reactive phenol-furfural resin having incorporated therewith an accelerator including a basic substance which will neither combine with nor yield aldehyde groups and hexamethylene tetramine.

16. The hereindescribed resinous condensation product comprising a reactive cresol-furfural resin having incorporated therewith an accelerator including a basic substance which will neither combine with nor yield aldehyde groups and hexamethylene tetramine.

17. The hereindescribed resinous condensation product comprising a reactive cresol-furfural resin having incorporated therewith an accelerator including lime and hexamethylene tetramine.

18. Method of making a resinous condensation product comprising incorporating with a reactive phenol-furfural resin an accelerator including a basic substance which will neither combine with nor yield aldehyde groups and a methylene-yielding body.

19. Method of making a resinous condensation product as defined in claim 18 in which the basic substance is a compound of a metal.

20. Method of making a resinous condensation product as defined in claim 18 in which the basic substance is a compound of an alkali forming metal.

21. Method of making a resinous condensation product as defined in claim 18 in which the basic substance is a compound of an alkaline earth metal.

22. Method of making a resinous condensation product as defined in claim 18 in which the basic substance is an alkaline earth metal oxid 23. Method of making a resinous condensation product as defined in claim 18 in which the basic substance is lime.

24. Method of making a resinous condensation product comprising incorporating with a reactive cresol-furfural resin an accelerator including a basic substance which will neither combine with nor yield aldehyde groups and a methylene-yielding body.

25. Method of making a resinous condensation product as defined in claim 24 in which the basic substance is lime.

26. Method of making a resinous condensation product comprising incorporating with a reactive phenol-furfural resin an accelerator including a basic substance which will neither combine with nor yield aldehyde groups and hexamethylene tetramine.

27. Method of making a resinous condensation product as defined in claim 26 in which the basic substance is lime.

28. Method of making a resinous condensation product comprising incorporating with a reactive cresol-furfural resin an accelerator including a basic substance which will neither combine with nor yield aldehyde groups and hexamethylene tetramine.

29. Method of making a resinous condensation product as defined in claim 28 in which the basic substance is lime.

In testimony whereof, I affix my signature.

NORMAN D. HANSON.